(12) United States Patent
Langston et al.

(10) Patent No.: US 9,056,679 B1
(45) Date of Patent: Jun. 16, 2015

(54) SYSTEM AND METHOD FOR AIRBORNE DEPLOYMENT OF OBJECT DESIGNED FOR WATERBORNE TASK

(71) Applicants: Tye A. Langston, Lynn Haven, FL (US); Rodolfo T. Arrieta, Panama City Beach, FL (US); Ted R. Clem, Lynn Haven, FL (US)

(72) Inventors: Tye A. Langston, Lynn Haven, FL (US); Rodolfo T. Arrieta, Panama City Beach, FL (US); Ted R. Clem, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 164 days.

(21) Appl. No.: 13/965,311

(22) Filed: Aug. 13, 2013

(51) Int. Cl.
*B64D 1/02* (2006.01)
*B64D 1/12* (2006.01)

(52) U.S. Cl.
CPC ...................... *B64D 1/12* (2013.01)

(58) Field of Classification Search
CPC ................. B64C 2201/18; B64C 2201/187; B64C 2201/128; B64C 2201/121; B64C 2201/12; B64C 2201/14; B64D 1/12; B64D 1/02
See application file for complete search history.

(56) References Cited

U.S. PATENT DOCUMENTS

| | | | | |
|---|---|---|---|---|
| 4,899,583 A | * | 2/1990 | Booker | 73/170.28 |
| 6,082,675 A | * | 7/2000 | Woodall et al. | 244/137.4 |
| 6,409,122 B1 | * | 6/2002 | Nicolai | 244/106 |

* cited by examiner

*Primary Examiner* — Brian M O'Hara
(74) *Attorney, Agent, or Firm* — James T. Shepherd

(57) ABSTRACT

An airborne deployment system and method for deploying an object designed. for a waterborne task. An unmanned aerial vehicle (UAV) has an object such as an unmanned underwater vehicle (UUV) releasably coupled thereto. The UAV is guided to a target site on a body of water in accordance with navigation. rules predicated on navigation capability of the UAV. The UUV Is released from the UAV at a location that is one of in the air and on the water in accordance with release rules predicated on the navigation capability of UAV.

4 Claims, 4 Drawing Sheets

SYSTEM AND METHOD FOR AIRBORNE DEPLOYMENT OF OBJECT DESIGNED FOR WATERBORNE TASK

ORIGIN OF THE INVENTION

The invention described herein may be manufactured and used by or for the Government of the United States of America for Governmental purposes without payment of any royalties.

FIELD OF THE INVENTION

The invention relates generally to airborne deployment methods, and more to a system and method for the airborne deployment of a vehicle or other object designed for a waterborne task.

BACKGROUND OF THE INVENTION

Searching for waterborne mines or improvised explosive devices is sometimes conducted from aerial platforms. After a waterborne explosive object is located, an investigation and neutralization platform is deployed. However, by separating these platforms, there is a risk that the investigation and neutralization platform will have to relocate the object or may lose track of it completely. Thus, it is important to rapidly place a follow-up platform or marker near an object once it has been located, especially if the located object is drifting.

SUMMARY OF THE INVENTION

Accordingly, it is an object of the present invention to provide a method and system for remotely deploying an unmanned waterborne vehicle or waterborne location indicator through the air to track or mark the location of an object of interest in the water.

Other objects and advantages of the present invention will become more obvious hereinafter in the specification and drawings.

In accordance with the present invention, an airborne deployment system includes an autonomous unmanned underwater. vehicle (UUV) and an unmanned aerial vehicle (UAV). The UAV has
- a controllable-throttle engine,
- at least one control surface having a control surface actuator,
- at least one clamp coupled to the UAV and configured to hold the UUV,
- a clamp actuator coupled to each clamp,
- a control system coupled to the engine, each control surface actuator, and each clamp actuator,
- a radio receiver coupled to the control system and tuned to receive radio signals from a remote location where the radio signals are indicative of instructions for implementation by the control system,
- a global positioning system (GPS) receiver coupled to the control system,
- at least one sensor coupled to the control system and selected from the group consisting of an optical sensor, a magnetic sensor, and a laser seeker, and
- a submersion sensor coupled to the control system and exposed to an ambient environment external to the UAV.

The control system comprises a memory device and computer processor programmed to
- receive and store data indicative of an initial global position of an at-sea location,
- receive the instructions from the radio receiver and responsively relay control signals derived from the instructions to the engine, each control surface actuator, and each clamp actuator,
- receive GPS data from the GPS receiver and responsively actuate the engine and each control surface actuator to pilot the UAV toward the initial global position when the instructions are not being received from the radio receiver,
- receive data indicative of a target position from the at least one sensor when the UAV is within a predetermined, distance to the initial global position and responsively actuate the engine and each control surface actuator to pilot the UAV toward the target position when the instructions are not being received from the radio .receiver, and
- actuate each clamp actuator to release its associated clamp in accordance with a hierarchy defined firstly by the instructions, secondly by data collected by at least one sensor, thirdly by the GPS data, and fourthly by data collected by the submersion sensor that is indicative of water submersion.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings. and wherein.

DETAILED DESCRIPTION OF THE INVENTION

Figure 1:
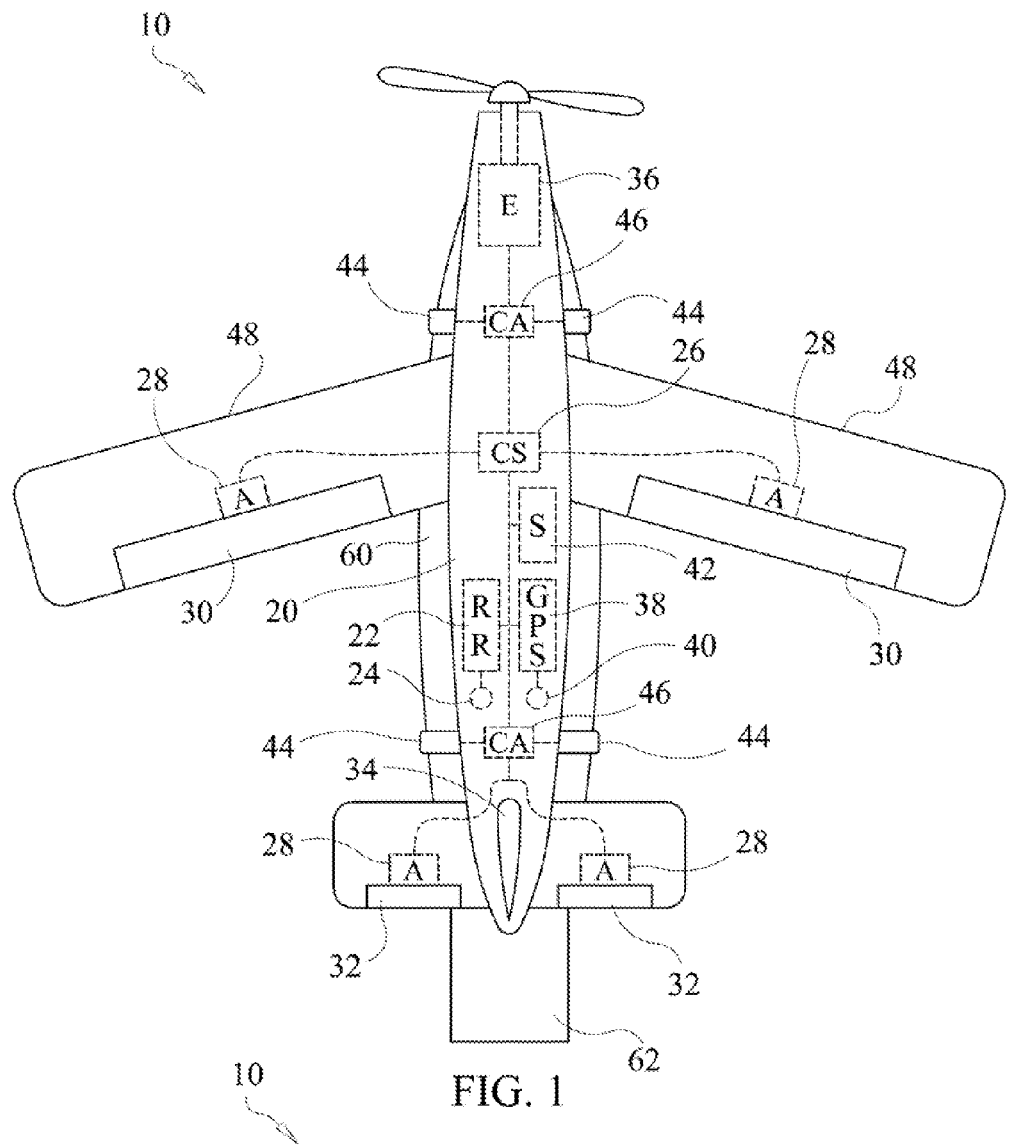
FIG. 1 is a schematic plan view of an airborne deployment system in accordance with an embodiment of the present invention.

Referring now to the drawings, simultaneous reference will be made to FIGS. 1 and 2 where a system for airborne deployment of an object designed far a waterborne task is shown and is referenced generally by numeral 10. In the illustrated embodiment, system 10 includes an unmanned aerial vehicle (UAV) 20 and an autonomous unmanned underwater vehicle (UUV) 60. UAV 20 is a self-propelled drone that is navigated by radio control or by onboard navigations systems, and is capable of transporting UUV 60 to a remote water location where a target object (not shown) has been detected. While the particular choice of UUV 60 is not a limitation of the present invention, it will generally be capable of autonomous navigation on/below the water's surface and can include target sensing and tracking capability. Further, the present invention could also be practiced by replacing UUV 60 with a location indicator, or marker beacon, that actively or passively provides long-distance indication of its location. Active means for providing long-distance indication include a transmitter and antenna installed in the marker beacon for broadcasting electromagnetic or radio signals.

UAV 20 has a radio control system that, in general, is any proven design used in the model aircraft or flying drone industry. Nearly all of these systems include a radio receiver ("RR") 22 coupled to an antenna 24 that receives remotely originating radio signals indicative of instructions used to control UAV 20. A control system ("CS") 26 (e.g., a processor with memory storage capability) coupled to radio receiver 22 executes/relays the instructions. In terms of UAV navigation, the instructions are used by control system 26 to derive control signals that are, in turn, used to responsively displace actuators ("A") 28 that move the UAV's control surfaces, such as ailerons 30, elevators 32, rudder 34, as well as control a controllable-throttle engine ("E") 36 to thereby pilot UAV 20 in the desired direction. The inclusion of a radio control system allows UAV 20 to be operated manually for launch, flight path control, and return to the launch platform.

System 10 also includes a GPS system 38 coupled to a GPS antenna 40 to allow autonomous navigation to a preprogrammed target location. The desired target location can be programmed into control system 26 prior to launch and updated during flight via radio signals or from feedback from onboard sensors. The combination of GPS receiver 38 and antenna 40 senses GPS signals from several orbital satellites. The GPS signals are passed to control system 26 where they are compared with the actual UAV location and the desired flight path. Control system 26 uses the GPS signals to correctively displace the UAV's control surfaces to reorient and pilot UAV 20 towards the remote target location.

As mentioned above, system 10 includes additional sensors ("S") 42 to aid in navigation. For example, as UAV 20 nears the target, sensors 42 can be optical or magnetic sensors that detect the target thereby allowing the UAV flight path to be finely adjusted through a feedback loop. Such flight path adjustment is useful for waterborne targets that are subject to movement due to wave, wind and current forces. In addition to using its own onboard sensors 42, UAV 20 could communicate with and utilize sensors onboard UUV 60. In cases where UUV 60 already has advanced optical or magnetic sensors, inclusion of similar sensors on UAV 20 can be omitted.

Figure 3:
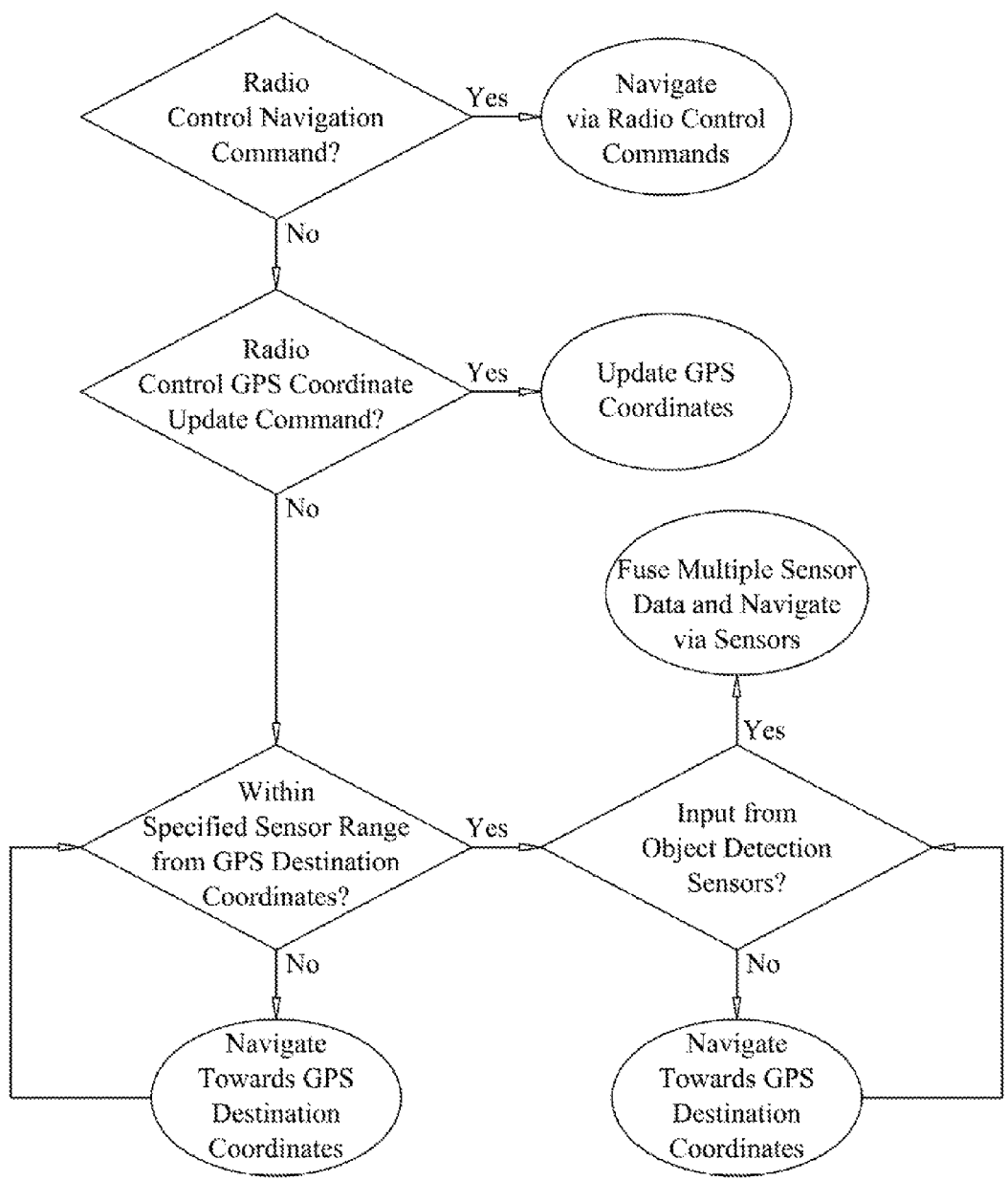
FIG. 3 is a flow diagram of the hierarchy rules governing navigation of the airborne deployment system in accordance with an embodiment of the present invention.

System 10 navigates in response to the instructions received via radio signals and/or sensor input, which is sorted into a hierarchy of importance as shown in FIG. 3. The most important inputs that can override all other control signals at all times are navigation commands (or instructions) provided via radio signals. This places a man in the loop so that take-off, landing and general navigation can be controlled manually if necessary or desired. Radio control also allows for missions to be aborted or GPS coordinates to be updated mid-flight. During the beginning stage of the flight path, the GPS coordinates rank second on the navigational hierarchy of importance in terms of directing UAV 20 in the general direction of the target zone. When UAV 20 comes within a predefined proximity to the destination GPS coordinates, the hierarchy of importance changes so that onboard sensor inputs take precedence over GPS coordinates. Therefore, if one or more sensors detect the target within the predefined destination proximity, that information overrides the GPS coordinates and the navigational path is adjusted accordingly. Input from multiple sensors can be fused together to account for variations in direction and range thereby resulting in a conglomerate bearing for system 10.

Referring again to FIGS. 1 and 2, system 10 also includes releasable clamps 44 that grip UUV 60. Clamps 44 serve to carry UUV 60 from a launch location to the desired remote location, at which point they release UUV 60 into the water. Clamp actuators ("CA") 46 are used to release clamps 44 in response to a control signal from control system 26 upon reaching the desired location, in response to a radio signal received by radio receiver 22, or upon submersion in water. If desired or needed, a parachute apparatus 62 can be coupled to UUV 60 where the parachute Is released to slow the descent of UUV 60 after separation from UAV 20.

Figure 4:
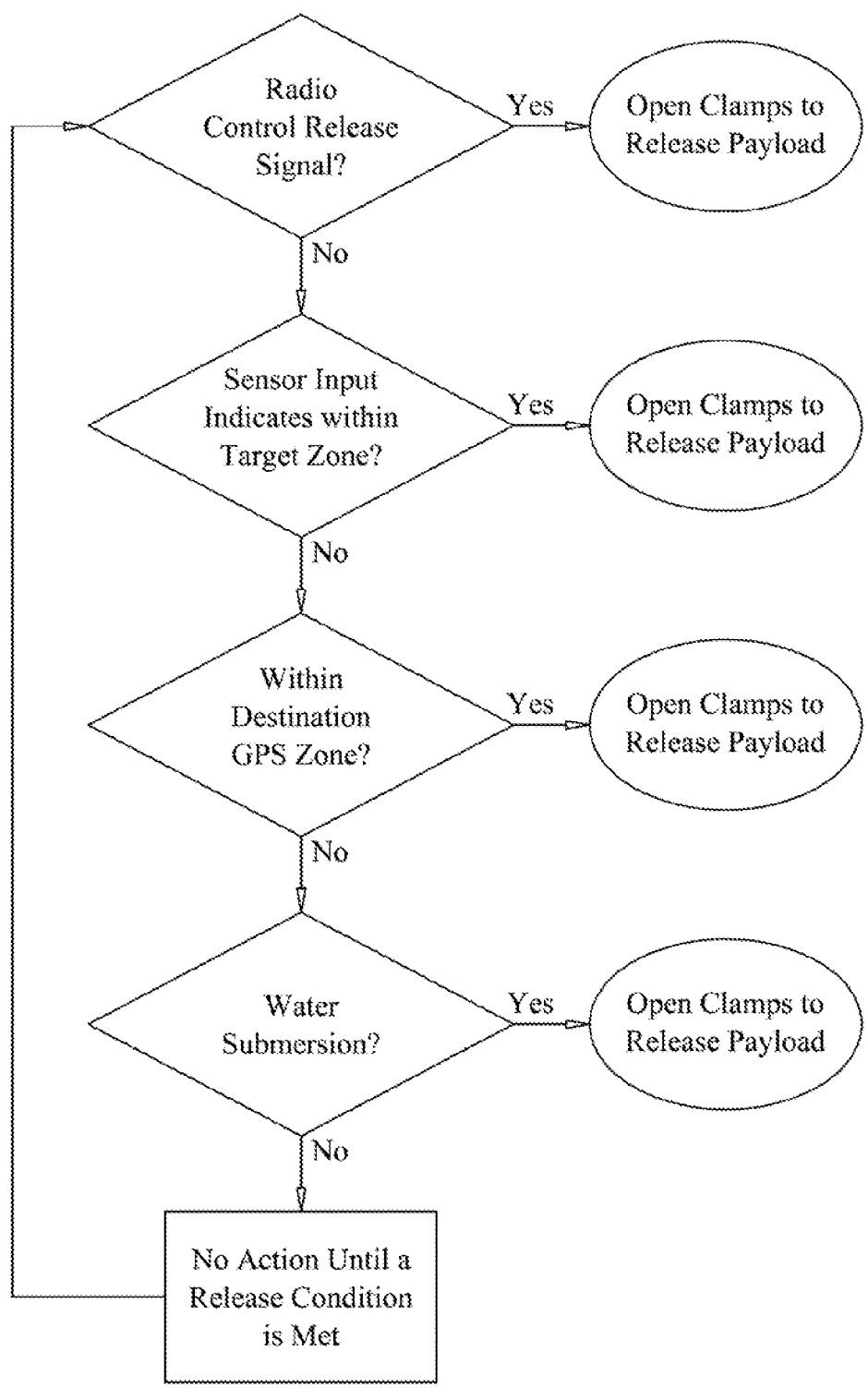
FIG. 4 is a flow diagram of the hierarchy rules governing release of an unmanned underwater vehicle (UUV) from the airborne deployment system in accordance with an embodiment of the present invention.

Clamp actuators 46 also operate by adhering to a hierarchy of importance as shown in FIG. 4. First on the hierarchy of importance is radio control command thereby allowing an operator to drop UUV 60 on demand. Second on the hierarchy of importance is a release controlled by data from onboard sensors 42, which can cause UUV 60 to be released upon reaching a certain proximity to the detected target. The next priority for clamp release is the current GPS coordinates of UAV 20. That is, if the vicinity of the GPS coordinates is reached and no release instructions have been received at radio receiver 22, and no onboard sensors 42 have reported detection, UUV 60 is released predicated on the current GPS coordinates. However, if the GPS coordinates are reached, but one or more of sensors reports detection and there is additional distance to travel to the target, control system 26 will ignore the GPS coordinates and control navigation in response to sensor inputs before releasing. Finally, the lowest priority for clamp release is water submersion. That is, if system 10 enters the water, UUV 60 will automatically be released.

System 10 can be launched from a small airstrip, catapulted into the air, or dropped from a host aircraft. To accommodate different launch scenarios, the UAV's wings 48 may be pivotally retracted to a position lateral to the UAV's body. After deployment, wings 48 can be pivotally extended to provide lift and dynamic control. A designer is free to select an appropriate aircraft design. However, whichever design is selected, wings 48 and the body of UAV 20 must be sufficiently designed to support the weight and dynamic forces of UAV 20 and UUV 60.

Figure 2:
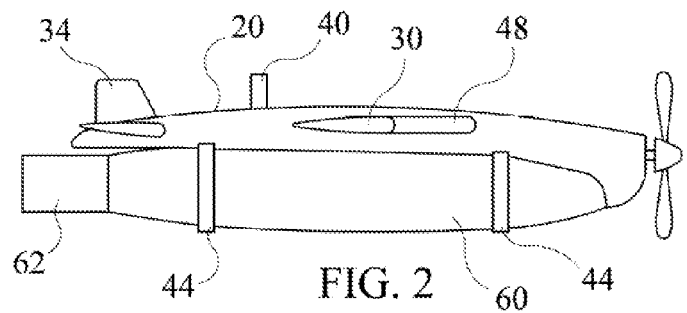
FIG. 2 is a side view of the airborne deployment system illustrated in FIG. 1.
Figure 5:
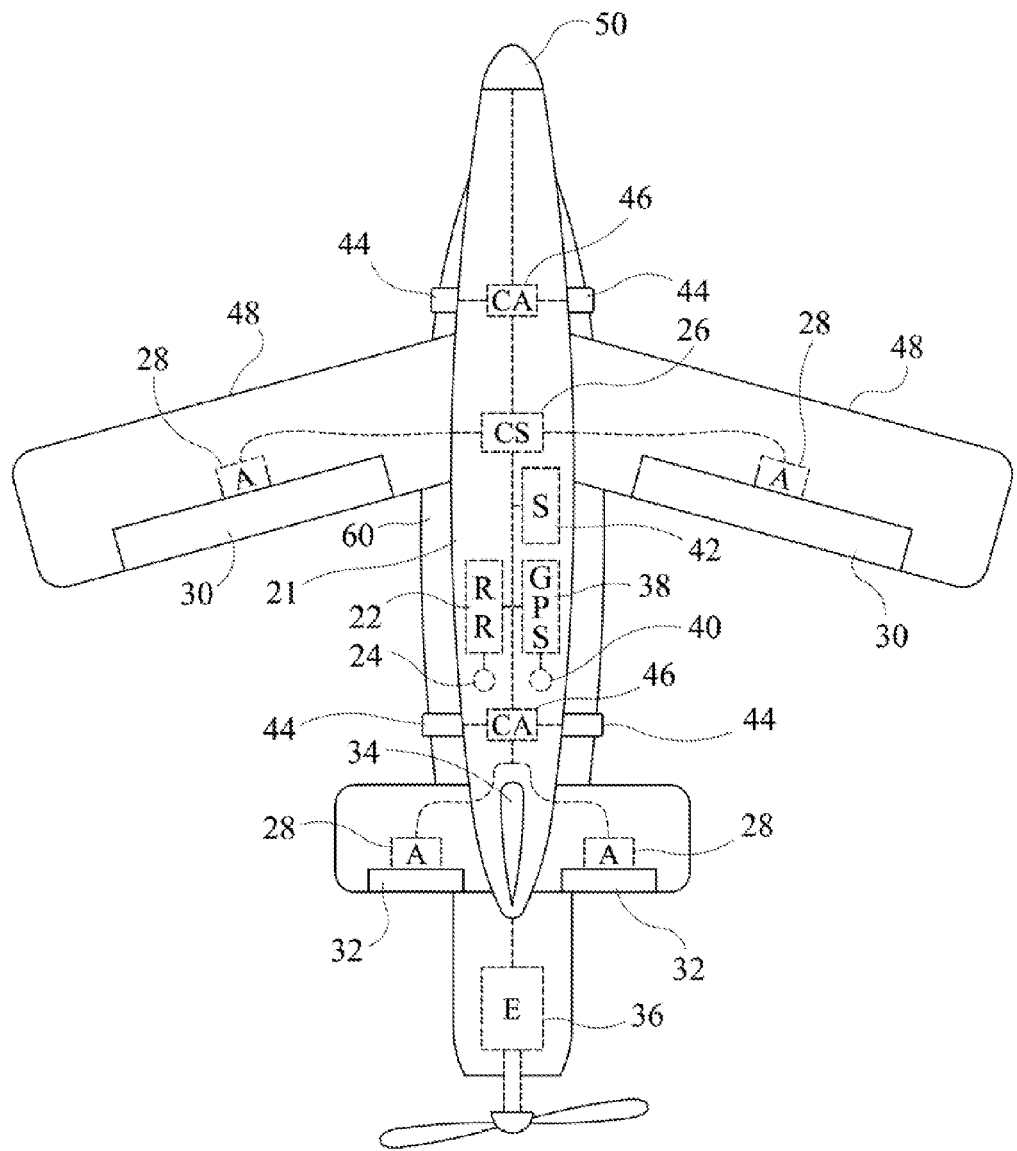
FIG. 5 is a schematic plan view of an airborne deployment system in accordance with another embodiment of the present invention.

While the embodiment shown in FIGS. 1 and 2 illustrates a UAV that is primarily navigated by radio control or by GPS positioning with the aid of other feedback sensors, the present invention is not so limited. For example, FIG. 5 illustrates a UAV 21 primarily guided by a laser seeker unit 50 that senses the relative direction of a laser spot aimed at a target and feeds the information to control system 26. Control system 26 interprets the direction of the laser designator and provides corrective control signals to the aircraft control surfaces to steer UAV 21 towards the target. The use of a laser seeker unit for guidance is known in the art. By way of example, one manifestation of this technology is the DAGR rocket guidance kit marketed by Lockheed Martin Corp. This guidance kit adapts to existing unguided rockets by providing a laser seeker head, control circuitry, and responsive control surfaces to guide the rocket towards a laser designator. If laser seeker 50 is used without a GPS system, UAV 21 will either enter the water near the location of the laser designator or complete precise navigation in response to sensor feedback. The system may enter the water at the destination point without a prior signal to release UUV 60. Thus, in this embodiment, clamps 44 are released either by manual instruction provided remotely through the radio receiver 22 before water submersion or by a release that is activated upon submersion in water.

Similar to UAV 20, UAV 21 can include additional sensors, such as optical sensors or magnetic sensors 42 to locate the target and aid in navigation. Optical or magnetic sensors 42 provide feedback thereby allowing UAV 21 to finely adjust its flight path to reach the target. Such flight path adjustment is useful for waterborne targets that are subject to movement due to wave, wind and current forces, or when sea conditions degrade the consistency of a laser spot to the point that precise navigation is hindered.

The advantages of the present invention are numerous. The primary advantage of the invention is that it allows for airborne deployment of an unmanned waterborne vehicle or an object-of-interest location indicator from a small lightweight aircraft. Such objects of interest may include mines or other waterborne explosive devices. This method of deployment allows for: (1) rapid airborne delivery of a payload, such as a UUV; (2) conservation of battery or fuel energy that would otherwise be used by a UUV during travel to the target location; (3) deployment ability in adverse water conditions; (4) safe, unmanned delivery into dangerous areas; and (5) reduction of the time and risk commitments that larger vessels would encounter.

Although the invention has been described relative to specific embodiments thereof, there are numerous variations and modifications that will be readily apparent to those skilled in the art in light of the above teachings. For example, the UAV can be a glide vehicle (i.e., no propulsion system) having control surfaces that are adjusted based upon GPS signals, laser, seeker collected data, or combinations thereof. Appropriate hierarchy rules governing navigation and UUV release can be programmed into a glide-based UAV's control system. It is therefore to be understood that, within the scope of the appended claims, the invention may be practiced other than as specifically described.

What is claimed as new and desired to be secured by Letters Patent of the United States is:

1. An airborne deployment system, comprising:
    a payload; and
    an unmanned aerial vehicle (UAV) having
        a controllable-throttle engine,
        at least one control surface having a control surface actuator,
        at least one clamp coupled to said payload and configured to hold said payload,
        a clamp actuator coupled to each said at least one clamp,
        a control system coupled to said engine, said at least one control surface actuator, and each said clamp actuator,
        a radio receiver coupled to said control system and tuned to receive radio signals from a remote location, said radio signals being indicative of instructions for implementation by said control system,
        a global positioning system (GPS) receiver coupled to said control system;
    at least one sensor coupled to said control system, said at least one sensor selected from the group consisting of an optical sensor, a magnetic sensor, and a laser seeker; and
    a submersion sensor coupled to said control system and exposed to an ambient environment external to said UAV;
    wherein said control system comprises a memory device and computer processor programmed to
        receive and store data indicative of an initial global position of an at-sea location,
        receive said instructions from said radio receiver and responsively relay control signals derived from said instructions to said engine, said at least one control surface actuator, and each said clamp actuator,
        receive GPS data from said GPS receiver and responsively actuate said engine and said at least one control surface actuator to pilot said UAV toward said initial global position when said instructions are not being received from said radio receiver,
        receive data indicative of a target position from said at least one sensor when said UAV is within a predetermined distance to said initial global position and responsively actuate said engine and said at least one control surface actuator to pilot said UAV toward said target position when said instructions are not being received from said radio receiver, and
        actuate each said clamp actuator to release its associated clamp in accordance with a hierarchy defined firstly by said instructions, secondly by data collected by said at least one sensor, thirdly by said GPS data, and fourthly by data collected by said submersion sensor that is indicative of water submersion.

2. The airborne deployment system of claim 1, wherein said payload comprises an autonomous unmanned underwater vehicle.

3. The airborne deployment system of claim 1, wherein said payload comprises a marker beacon.

4. The airborne deployment system of claim 3, wherein said marker beacon comprises means for broadcasting the location said marker beacon.

* * * * *